(12) United States Patent
Xie

(10) Patent No.: US 10,200,517 B2
(45) Date of Patent: Feb. 5, 2019

(54) DISPLAY SCREEN ASSEMBLY AND MOBILE TERMINAL

(71) Applicant: Guangdong Oppo Mobile Telecommunications Corp., Ltd., Dongguan (CN)

(72) Inventor: Xiangkun Xie, Dongguan (CN)

(73) Assignee: Guangdong Oppo Mobile Telecommunications Corp., Ltd., Dongguan (CN)

( * ) Notice: Subject to any disclaimer, the term of this patent is extended or adjusted under 35 U.S.C. 154(b) by 0 days.

(21) Appl. No.: 15/685,033

(22) Filed: Aug. 24, 2017

(65) Prior Publication Data
US 2018/0063305 A1 Mar. 1, 2018

(30) Foreign Application Priority Data

Aug. 31, 2016 (CN) .......................... 2016 1 0794607
Aug. 31, 2016 (CN) ...................... 2016 2 1027986 U

(51) Int. Cl.
*H04M 1/02* (2006.01)
*H04N 5/225* (2006.01)

(52) U.S. Cl.
CPC ....... *H04M 1/0264* (2013.01); *H04M 1/0266* (2013.01); *H04N 5/2253* (2013.01); *H04N 5/2257* (2013.01)

(58) Field of Classification Search
CPC .......................... H04M 1/0266; H04M 1/0264
USPC .......................... 455/550.1, 566, 575.1, 90.1
See application file for complete search history.

(56) References Cited

U.S. PATENT DOCUMENTS

| 2002/0065102 | A1 | 5/2002 | Miyake et al. | |
| 2013/0016267 | A1 | 1/2013 | Ko et al. | |
| 2013/0057804 | A1* | 3/2013 | Kuo | G06F 1/1601 349/60 |
| 2014/0078708 | A1 | 3/2014 | Song et al. | |
| 2014/0092625 | A1* | 4/2014 | Lin | G02B 6/005 362/606 |
| 2014/0267990 | A1 | 9/2014 | Moon et al. | |

(Continued)

FOREIGN PATENT DOCUMENTS

| CN | 203120316 | 8/2013 |
| CN | 104052838 | 9/2014 |
| CN | 104125384 | 10/2014 |

(Continued)

*Primary Examiner* — John J Lee
(74) *Attorney, Agent, or Firm* — Young Basile Hanlon & MacFarlane, P.C.

(57) ABSTRACT

A display screen assembly is provided and includes a display screen module and an installation bracket. The display screen module includes a body portion and a top portion. The top portion includes a top surface and an inclined surface connected with one side of the top surface. The inclined surface extends obliquely towards a direction of facing the body portion. The installation bracket includes an abutting wall. An installation groove is defined in the installation bracket. The abutting wall includes a supporting surface facing the installation groove. A thickness of the abutting wall gradually decreases along the inclined surface in a direction towards the top surface to form an installed inclined surface. The installed inclined surface is opposite to the supporting surface and abuts against the inclined surface. A mobile terminal is further provided.

20 Claims, 2 Drawing Sheets

(56) References Cited

U.S. PATENT DOCUMENTS

2014/0293519 A1* 10/2014 Wang ................... G06F 1/1616
                                                                    361/679.01
2015/0109546 A1*  4/2015 Tai ....................... G02B 6/0036
                                                                         349/12

FOREIGN PATENT DOCUMENTS

| CN | 106210205 | 12/2016 |
| CN | 206135994 | 4/2017 |
| EP | 2547072 | 1/2013 |
| EP | 2778832 | 9/2014 |

* cited by examiner

DISPLAY SCREEN ASSEMBLY AND MOBILE TERMINAL

RELATED APPLICATIONS

This application claims the benefit of priority of Chinese Patent Application Nos. 201610794607.0 and 201621027986.2, both filed on Aug. 31, 2016. The contents of the above applications are all incorporated by reference as if fully set forth herein in their entirety.

FIELD AND BACKGROUND OF THE INVENTION

The present disclosure relates to the field of communication technology, and in particular, to a display screen assembly and a mobile terminal.

In the pursuit of light and thin appearance, if overall size of existing mobile terminals, such as mobile phones, is reduced, layout in an internal space thereof would inevitably be compact. Camera modules, as an important feature of mobile phones, are generally mounted to tops of the mobile phones. Due to limited space inside the cases of the mobile phones, installation of the camera modules may easily lead to increase of overall size of the mobile phones.

BRIEF DESCRIPTION OF THE SEVERAL VIEWS OF THE DRAWINGS

To describe the structural features and technical effects of the present disclosure more clearly, the following introduces the accompanying drawings required for describing the embodiments of the present disclosure.

DESCRIPTION OF SPECIFIC EMBODIMENTS OF THE INVENTION

The following clearly and completely describes the technical solutions in the embodiments of the present disclosure with reference to the accompanying drawings in the embodiments of the present disclosure.

Figure 1:
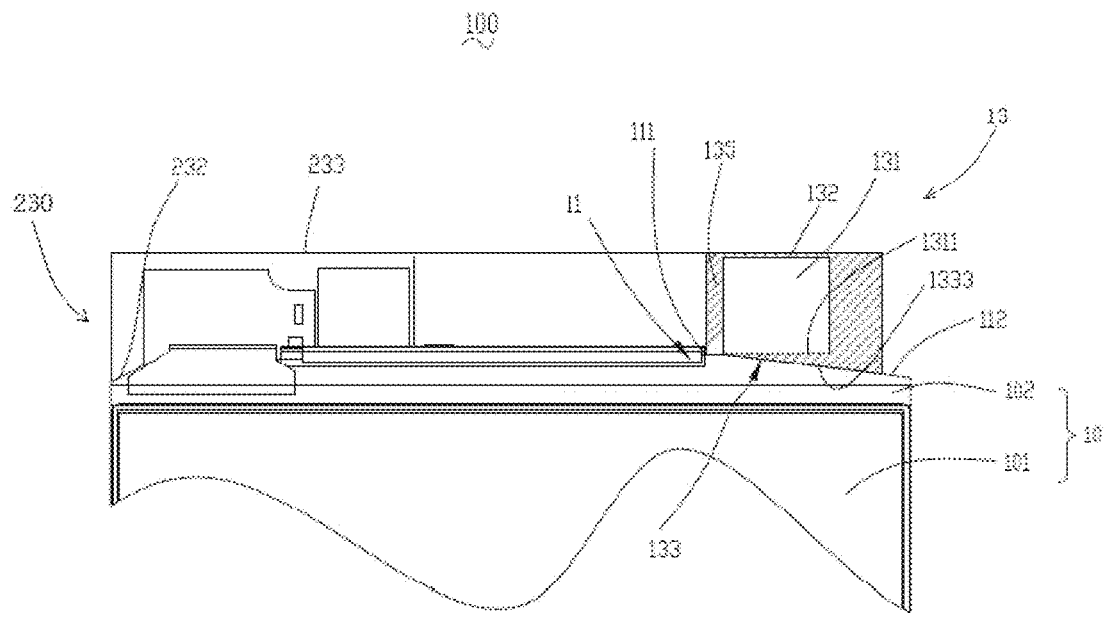
FIG. 1 is a partially cross-sectional view of a display screen assembly according to an embodiment of the present disclosure.
Figure 3:
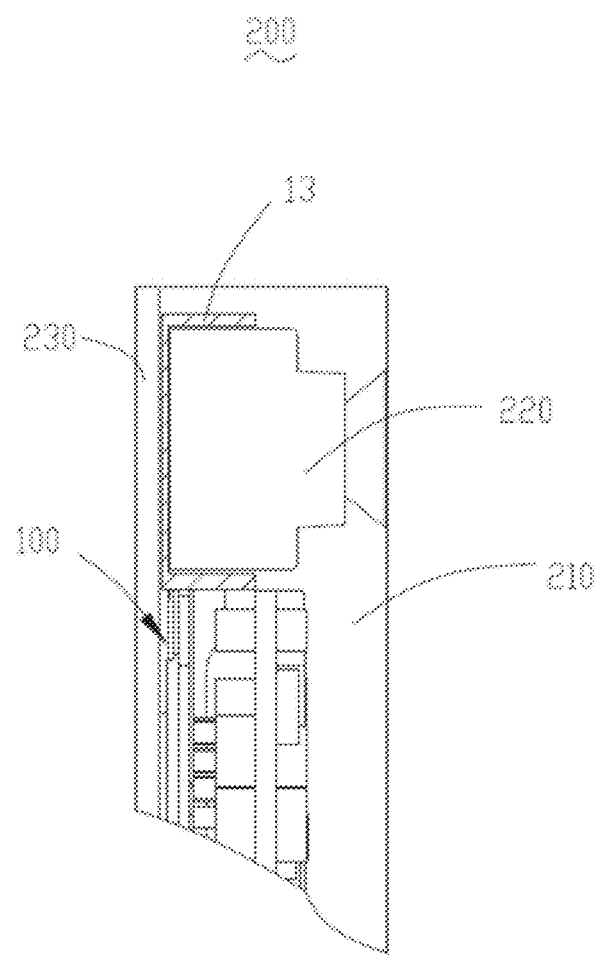
FIG. 3 is a partially cross-sectional view of a mobile terminal according to an embodiment of the present disclosure.

Please refer to FIG. 1 and FIG. 3, the present disclosure provides a display screen assembly 100 and a mobile terminal 200 having the display screen assembly 100. The mobile terminal 200 further includes a terminal body 210, a front housing 230, and a camera module 220 mounted to an inner surface of the front housing 230. As shown in FIG. 3, the display screen assembly 100 is mounted between the terminal body 210 and the front housing 230. The camera module 220 is disposed on a top of the display screen assembly 100.

As shown in FIG. 1, the display screen assembly 100 includes a display screen module 10 and an installation bracket 13. The display screen module 10 has a top portion 11. The top portion 111 includes a top surface 111 and an inclined surface 112 connected to a side of the top surface 111. The installation bracket 13 includes an abutting wall 133. An installation groove 131 is defined in the installation bracket 13. The camera module 220 is mounted in the installation groove 131, and is spaced from the display screen module 220 by the abutting wall 133.

In this embodiment, the abutting wall 133 has a supporting surface 1311 facing the installation groove 131, and thickness of the abutting wall 131 gradually decreases along the inclined surface 112 in a direction towards the top surface 111 to form an installed inclined surface 1333. The supporting surface 1311 is parallel with the top surface 111. In this embodiment, the supporting surface 1311 and the top surface 111 are disposed on the same plane. In other embodiments, the supporting surface 1311 is lower than the top surface 111 to save more space occupied by height of the installation bracket. The installed inclined surface 1333 is opposite to the supporting surface 1311 and abuts the inclined surface 112. The supporting surface 1311 is a horizontal surface for supporting the camera module 220.

In this embodiment, the front housing 230 includes a protective panel 232 and a frame 233 mounted to a periphery of the protective panel 232. The display screen module 10 is fixedly connected to the front housing 230. As shown in FIG. 1, the display screen module 10 has a screen region 101 and a housing 102. The housing 102 is fixed to the frame 233. The top portion 11 is a top portion of the housing 102. The top surface 111 and the inclined surface 112 are outer surfaces of the housing 102.

The inclined surface 112 is inclined towards a body portion of the display screen module 10. An included angle between the inclined surface 112 and the top surface 111 ranges from 3 degrees to 3.2 degrees, and a smallest height difference therebetween is 0.3 mm, so as to save as much space as possible in the front housing. A relative height relationship between the inclined surface 112 and the top surface 111 is that the height of the top surface 111 is higher than height of the inclined surface 112. One side or two sides of the top surface 111 are provided with said inclined surface 112, which can save inner space of the mobile terminal.

In this embodiment, the installation bracket 13 is substantially a square frame body which is mounted to the frame 233 and forms a groove shape with the inner surface of the frame 233. Specifically, the installation bracket 13 includes a top wall 132, two opposite sidewalls 135 and the abutting wall 133 which is opposite to the top wall 132. The two sidewalls 135 are connected to the top wall 132 and the abutting wall 133 to further form the installation groove 131. The abutting wall 133 extends to the top surface 111. In this embodiment, the abutting wall 133 extends to a position where the top surface is connected to the inclined surface 112.

In this embodiment, the installation bracket 13 is mounted to the front housing 230 and supported by the inclined surface 12. The camera module 220 is mounted in the installation groove 131 and supported by the supporting surface 1311. The installed inclined surface 1333 abuts against the inclined surface 112. Under the premise that the install angle and size of the camera module 220 do not changed, by using the inclined region provided by the inclined surface 112 relative to the top surface 111, a portion of the volume of the installation bracket 13 is disposed within the inclined region; and the abutting wall 133 of the installation bracket 13 is adaptedly mounted against the inclined surface 112 via the installed inclined surface 1333 without influencing the inner space of the installation groove 131, which as a whole, reduces the height of the installation bracket 13 on the top portion and thus further reduces the size of the mobile terminal along its length direction. The camera module 220 is mounted in the installation groove 131. The terminal body and the display screen assembly 10 are fixedly stacked up and assembled together.

In the display screen assembly of the present disclosure, with the mounting and matching of the installed inclined surface 1333 and the inclined surface 112, the installation bracket 13 is disposed in the region with a height difference formed by the inclined surface 112 and the top surface 111, which is able to not only fully utilize the space but also save the overall length for the mobile terminal. It can be appreciated that the installation bracket 13 may also be used to accommodate at least one functional component of the mobile terminal such as a speaker, a vibrator, etc.

Figure 2:
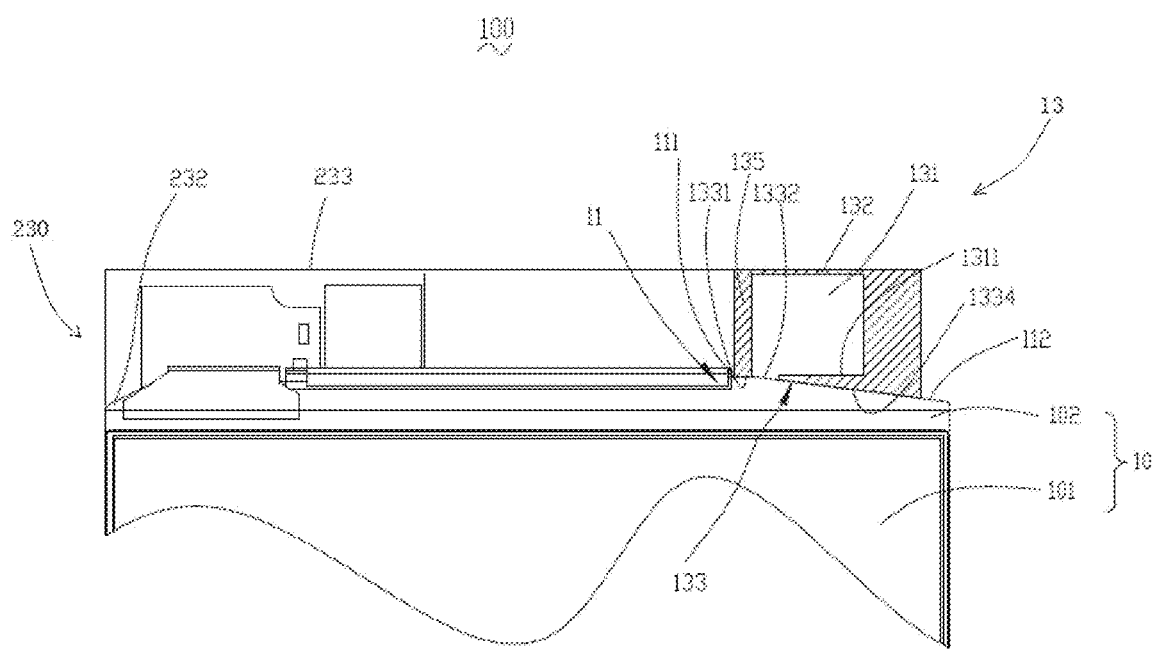
FIG. 2 a partially cross-sectional view of the display screen assembly according to another embodiment of the present disclosure.

Please refer to FIG. 2 which illustrates an embodiment different from the foregoing embodiment in that the abutting wall 133 is provided with an opening 1332. The opening 1332 is connected with the installation groove 131. The abutting wall 133 is spaced from the top surface 111 by the opening 1332. Specifically, the opening 1332 is formed on the installed inclined surface 1334 at a position corresponding to a portion of the abutting wall 133 with the smallest thickness.

At least one of the sidewalls 135 has a horizontal abutting surface 1331. In one implementation manner, the horizontal abutting surface 1331 abuts against the top surface 111. The horizontal abutting surface 1331 is spaced from the installed inclined surface 1333 by the opening 1332. The opening 1332 communicates with the installation groove 131.

In this embodiment, the opening 1332 is defined by the abutting wall 133 and located adjacent to one of the sidewalls 135. The horizontal abutting surface 1331 is an end surface of the sidewall 135 beside the opening 1332. The installed inclined surface 1334 is an outer surface of the abutting wall 133, and the installed inclined surface 1334 of the second embodiment is equivalent to the installed inclined surface 1333 of the first embodiment minus the opening 1332.

In one embodiment, a relative height relationship between the horizontal abutting surface 1331 and the installed inclined surface 1334 is that the height of the horizontal abutting surface 1331 is higher than that of the installed inclined surface 1334.

In this embodiment, the installation bracket 13 is supported by the inclined surface 12. The horizontal abutting surface 1331 abuts against the top surface 111. The installed inclined surface 1334 abuts against the inclined surface 112. The opening 1332 is located at a position corresponding to a junction of the top surface 111 and the inclined surface 112. In a length direction of the mobile terminal, the opening 1332 of the installation bracket reduces the height of the stack of the installation bracket and the top portion, thereby reducing the height of the stack of the display screen module 10 and the camera module 220 to achieve size reduction along the length direction of the mobile terminal.

The foregoing descriptions are merely embodiments of the present disclosure, and it should be noted that, for a person skilled in the related art, changes and modifications to the described embodiments can be carried out without departing from the principle of the present disclosure. These changes and modifications shall fall within the protection scope of the present disclosure.

What is claimed is:

1. A display screen assembly, comprising:
   a display screen module and an installation bracket, wherein the display screen module comprises a body portion and a top portion; the top portion comprises a top surface and an inclined surface connected to a side of the top surface; the inclined surface extends obliquely in a direction towards the body portion; the installation bracket comprises an abutting wall; an installation groove is defined in the installation bracket; the abutting wall comprises a supporting surface facing the installation groove;
   wherein a thickness of the abutting wall gradually decreases along the inclined surface in a direction towards the top surface to form an installed inclined surface, and wherein the installed inclined surface is opposite to the supporting surface and in contact with the inclined surface.

2. The display screen assembly as claimed in claim 1, wherein the abutting wall extends to the top surface.

3. The display screen assembly as claimed in claim 1, wherein the abutting wall is provided with an opening, and the opening is connected with the installation groove.

4. The display screen assembly as claimed in claim 3, wherein the abutting wall is spaced from the top surface by the opening.

5. The display screen assembly as claimed in claim 1, wherein an included angle between the inclined surface and the top surface ranges from 3 degrees to 3.2 degrees.

6. The display screen assembly as claimed in claim 1, wherein the supporting surface is parallel with the top surface.

7. The display screen assembly as claimed in claim 1, wherein the supporting surface and the top surface are disposed in the same plane.

8. A mobile terminal, comprising:
   a camera module and a display screen assembly;
   wherein the display screen assembly comprises a display screen module and an installation bracket; the display screen module comprises a body portion and a top portion; the top portion comprises a top surface and an inclined surface connected to a side of the top surface; the inclined surface extends obliquely in a direction towards the body portion; the installation bracket comprises an abutting wall; an installation groove is defined in the installation bracket; the abutting wall comprises a supporting surface facing the installation groove;
   wherein thickness of the abutting wall gradually decreases along the inclined surface in a direction towards the top surface to form an installed inclined surface, and wherein the installed inclined surface is opposite to the supporting surface and in contact with the inclined surface; and
   wherein the camera module is mounted in the installation groove, and is spaced from the display screen module by the abutting wall.

9. The mobile terminal as claimed in claim 8, wherein the installation bracket further comprises a top wall and two opposite sidewalls extending from two ends of the top wall; the top wall, the sidewalls and the abutting wall surround and form the installation groove; the camera module is mounted to the supporting surface of the abutting wall.

10. The mobile terminal as claimed in claim 8, wherein the mobile terminal further comprises a front housing, and the front housing comprises a protective panel and a frame mounted to a periphery of the protective panel; the display screen assembly is fixed to an inner surface of the front housing; the installation bracket is mounted to the frame.

11. The mobile terminal as claimed in claim 8, wherein the abutting wall extends to the top surface.

12. The mobile terminal as claimed in claim 8, wherein the abutting wall is provided with an opening, and the opening is connected with the installation groove.

13. The mobile terminal as claimed in claim 12, wherein the abutting wall is spaced from the top surface by the opening.

14. The mobile terminal as claimed in claim 8, wherein an included angle between the inclined surface and the top surface ranges from 3 degrees to 3.2 degrees.

15. The mobile terminal as claimed in claim 8, wherein the supporting surface is parallel with the top surface.

16. The mobile terminal as claimed in claim 8, wherein the supporting surface and the top surface are disposed in the same plane.

17. A display screen assembly, comprising a display screen module and an installation bracket; wherein the display screen module comprises a body portion and a top portion; the top portion comprises a top surface and an inclined surface connected to a side of the top surface; the inclined surface extends obliquely and upwardly in a direction towards the body portion;

the installation bracket comprises an installation groove and an abutting wall; the abutting wall comprises a supporting surface facing the installation groove; thickness of the abutting wall gradually decreases along the inclined surface in a direction towards the top surface to form an installed inclined surface; the installed inclined surface is opposite to the supporting surface and in contact with the inclined surface; the abutting wall is provided with an opening, and the opening is connected with the installation groove; the opening of the abutting wall is located at a position corresponding to a junction of the top surface and the inclined surface.

18. The display screen assembly as claimed in claim 17, wherein the installation bracket further comprises a top wall and two opposite sidewalls extending from two ends of the top wall; the top wall, the sidewalls and the abutting wall surround and form the installation groove; and the opening is formed through a junction of the abutting wall and one of the sidewalls.

19. The display screen assembly as claimed in claims 18, wherein the supporting surface is parallel with the top surface.

20. The display screen assembly as claimed in claim 19, wherein the supporting surface is lower than the top surface.

* * * * *